United States Patent Office 3,446,126
Patented May 27, 1969

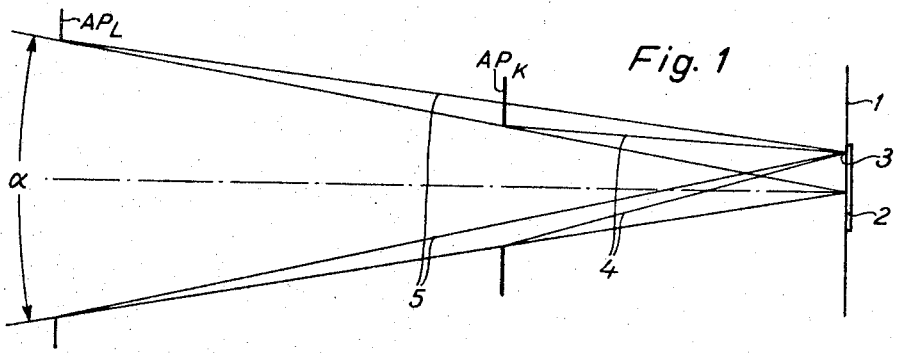
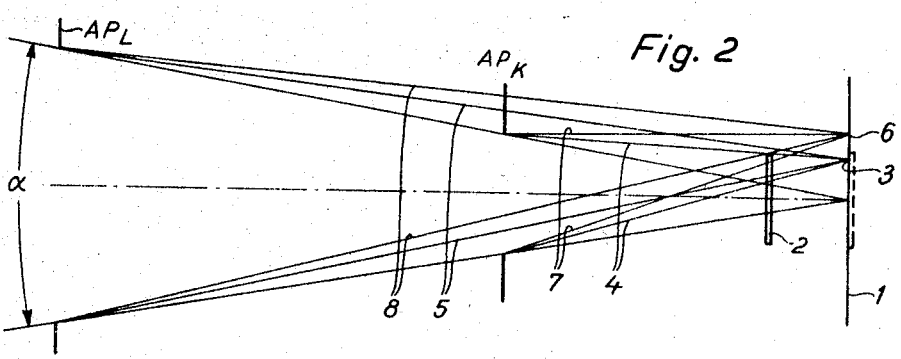
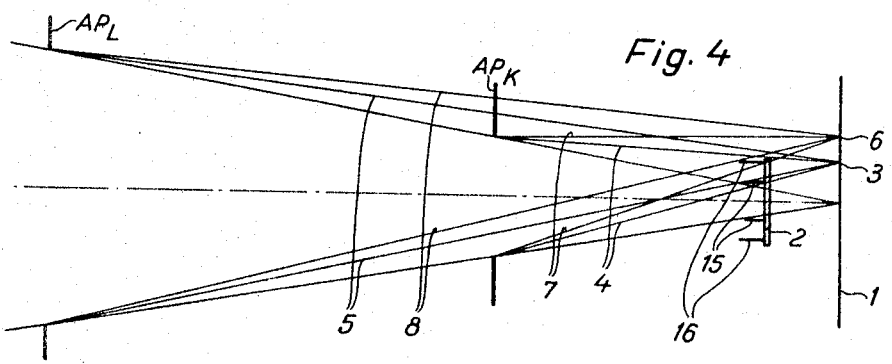
INVENTORS
LUDWIG LEITZ
HEINRICH BROSCHKE

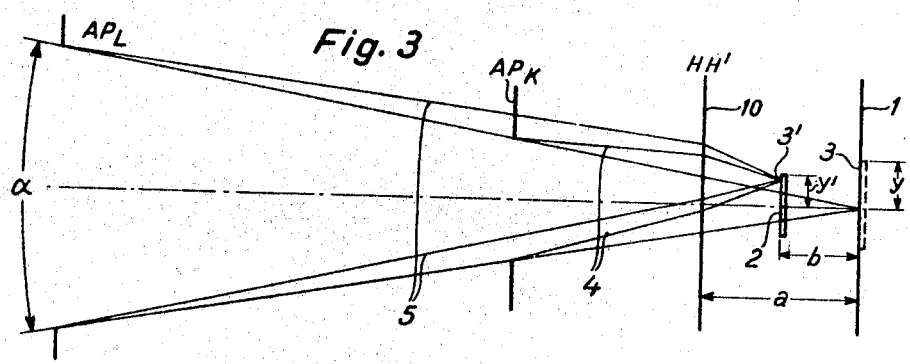
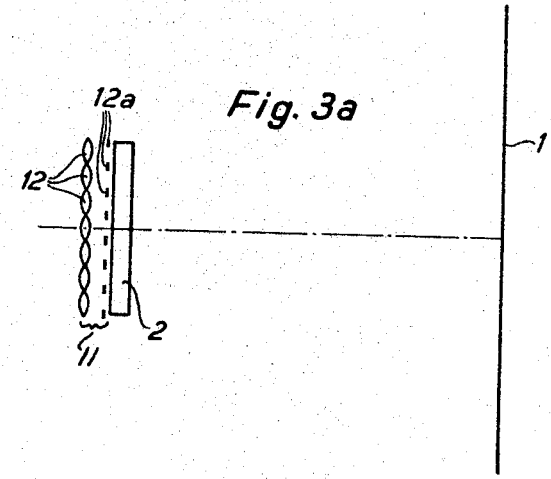

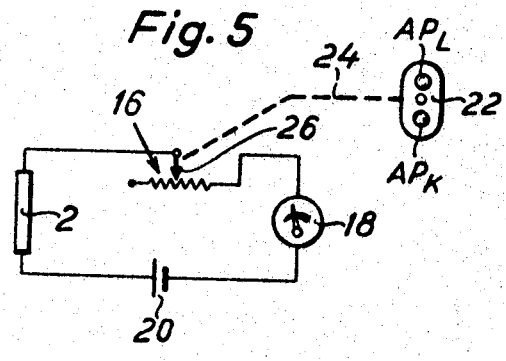
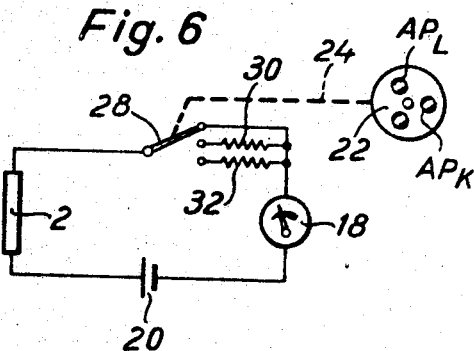
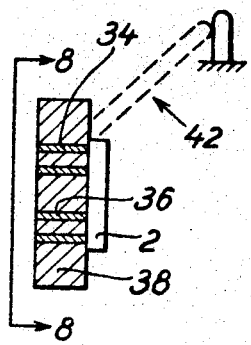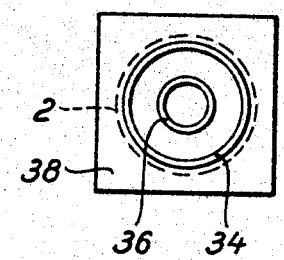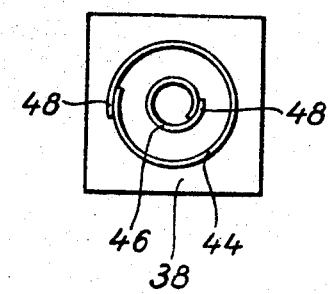
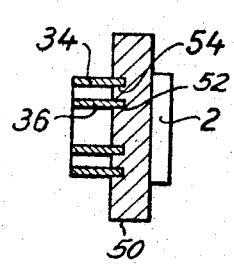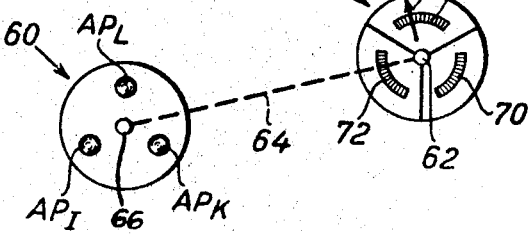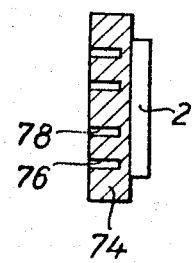
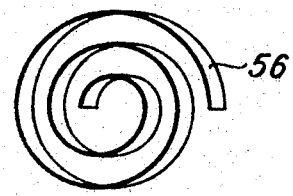

3,446,126
CAMERA OF THE STILL AND MOTION PICTURE TYPE
Ludwig Leitz and Heinrich Broschke, Wetzlar, Germany, assignors to Ernst Leitz G.m.b.H., Wetzlar, Germany
Filed Apr. 7, 1965, Ser. No. 446,185
Claims priority, application Germany, Apr. 15, 1964, L 47,600
Int. Cl. G01j *1/04;* G03b *19/12*
U.S. Cl. 95—10
17 Claims

ABSTRACT OF THE DISCLOSURE

A photographic camera having interchangeable objective lenses of different focal lengths and also having a photoelectric exposure meter the light sensitive member of which is disposed in the path of light rays between said objective and the film plane of the camera. There is provided a device for compensating for the different amounts of light falling on the light sensitive member when the different objective lenses are used as a result of said light sensitive member not being positioned in said film plane. The compensating device is disclosed to be either optical, electrical or mechanical in nature.

---

This invention relates to cameras of the still and motion picture type which utilize changeable objective lenses and which cameras are combined with a photoelectric exposure meter whose photoelectric element is positioned in the path of the image producing light rays.

Positioning the photoelectric element of the exposure meter in the path of the light rays from the objective lens to the plane of the film for exposure measurement has a great advantage in that adjustment of the diaphragm opening at the objective lens controls not only the amount of light that passes to film, but also that which passes to the photoelectric element. The photoelectric element may be of the type whose resistance changes in accordance with varying light conditions. The size of diaphragm opening, the light absorption by the filter when used, and the different light transmissions by different objectives will then directly affect the functioning of the exposure meter.

Cameras with changeable objective lenses have the disadvantage that when objectives of different focal lengths are used, the total amount of light which passes through the objective lens will reach all points on the photoelectric element positioned in the path of the image producing light rays only when the element is in the plane of the film. Unfortunately, positioning the element there is impossible because this space must be reserved for the film. In cameras with focal plane shutters immediately in front of the plane of the film, the difficulty is still greater because there a space of several millimeters must be left between the photoelectric element and the film to permit the shutter to function.

When the photoelectric element is positioned in the path of the image producing light rays between the objective lens and the plane of the film, there are fewer light rays which impinge upon the element so positioned when objective lenses of longer focal lengths are used than when objective lenses of shorter focal length are used. Of course, if the photoelectric element were positioned in the plane of the film, the element would receive the total light rays from either long or short focal length lenses; however, when the element is positioned between the objective lens and the film plane some of the rays along the periphery of the element bypass the element.

This phenomenon is the result of different picture taking angles of objective lenses having different focal lengths. With objective lenses having longer focal lengths the image producting rays are inclined at a smaller angle than the similar rays from a lens having a shorter focal length. This means that the image producing rays from a longer focal length lens are less converging than the rays from an objective lens having a shorter focal length.

When the photoelectric element is positioned in the path of the image producing light rays and is displaced along the optical axis thereof towards the objective lens and away from the plane of the film, the photoelectric element responds more strongly so as to give an erroneously stronger reading which causes underexposure of the film taken under the erroneous reading. This condition can be corrected by suitable calibration of the exposure meter. It is found, however, that with objective lenses of constant aperture but with longer or shorter focal lengths, the amounts of light radiation which fall upon the photoelectric element will differ and will be greater with objective lenses having shorter focal lengths. This will result in a stronger response of the meter so that the final result will be underexposure of the picture in those instances in which the exposure measuring device has been calibrated with an objective lens of greater focal length than the one being used to take the picture. On the other hand, if the exposure meter had been calibrated with an objective lens of shorter focal length the pictures that are taken with objective lenses of greater focal length will be overexposed.

In the present invention, this difficulty is obviated by using the following compensating means: (1) Optical photoelectrical converter, (2) electric means in the circuit of the exposure meter, or (3) mechanical means in the structure of the meter to compensate for differences in the responsiveness of the exposure meter when objective lenses of different focal lengths are used.

If the above means are optical in nature, they may comprise light refracting elements such as lenses or diaphragm systems positioned in front of the photoelectric element. The light refracting elements divert the light rays in such a manner that the parallel rays which enter the objective lens and approach the film will be brought to a focus in the plane of the photoelectric element instead of at the surface of the film.

This change of focusing is accomplished by lens means which are positioned in the path of the image producing light rays between the photoelectric element and the objective lens. In essence the lens means produce the same excitation in the photoelectric element when in this position as though the element were positioned in the plane of the film. The rays which would have been lost around the perimeter of the element are directed to the element by the lens means. Care should be taken to insure that the lens means are of sufficient size in order that the lens means itself does not restrict the light radiation by being of insufficient size.

Exact calculations on the basis of constant average values for focal lengths and diaphragm positions of the changeable objective lenses as well as the practical necessity of spacing the photoelectric element from the film surface, have shown that a lens or lens system which would be adequate to make the desired correction would have to be of a thickness and diameter that would be unsuitable for building into a camera having an objective lens with a very short focal length. In such construction, it may be preferable to use a grating plate formed of a plurality of small lenses adjacent to one another wherein each individual lens faces a small blind instead of using a single large lens. These small lenses would collectively have the same effect as a single large lens.

Another method of obtaining corrected measured values from the photoelectric element under different excitations consists of including in the electric circuit of the exposure meter a variable resistor which will have a higher resistance when an objective lens with shorter focal length is used. The exposure meter circuit would then have to be calibrated to agree with the theoretical arrangement in which the photoelectric element is in the plane of the film so that with all of the objective lenses the element will be encountered by more than the theoretical amount of light radiation. The voltage thus produced, which is higher than it should be, is then brought down to its proper value by the appropriate resistor. The selection of the proper resistor can be made manually with the help of a scale, or the turret which carries the objective lenses could be provided with a cam for switching in the proper resistor automatically.

Another construction for obtaining corrected measured values when using different objective lenses would be by mechanical means. For example, the meter itself could be rotatably mounted on the camera so that by its rotation the difference in its responsiveness with lenses of different focal lengths could be compensated for. The rotation can be performed by hand, as for example, by bringing the meter into a position corresponding to the objective that is used. The objective lenses could also be provided with above mentioned cams whereby the meter would be brought automatically into the required angular position by the turning of the turret which carries the various objective lenses.

Instead of rotatably mounting the meter, it would also be possible to mount the meter in fixed position and to provide a rotatable scale.

All the means that have been described above for correcting either the variable amounts of light that reach the converter or the effects thereof are adapted to make an exact correction of the measured values. The data that are required for correction in each case can be produced either empirically or by calculation.

In accordance with this invention another method of correction will now be suggested which has the advantage of being very simple and inexpensive in its manufacture and adaptation to the photoelectric converter, but which permits only an approximate and not an accurate correction. Experiments have shown that the corrections thus made are so close to the exact values that they are good enough for all practical purposes. Such correcting means consist of solid rings of thin material positioned concentrically around the optical axis and in front of the photoelectric element. When objective lenses of short focal length are used, these rings will intercept the marginal rays which are steeply inclined to the optical axis and in this manner reduce the amount of light arriving at the photoelectric element to approximate the amount of light it would have received if an objective of longer focal length were used. The number of rings and their dimensions depend on the diameter of the converter and on the position and aperture of the diaphragm.

A further simplification of the above construction to be later described consists of using a spirally formed band instead of the concentric rings.

An object of this invention is to produce a camera with exposure meter means in which the photoelectric element of the meter means is positioned in the path of the image producing light rays between the objective lens and the plane of the film.

A further object is to produce a camera of the above type in which the exposure meter means is adaptable to provide corrected readings when used with objective lenses having different focal lengths.

Another object of this invention is to provide a camera of the above type which is economical to produce.

These and other objects and advantages will be further explained in the following description and drawings in which:

FIGURE 1 is a schematic representation of a photoelectric element in the plane of the film with the theoretical paths of light rays to a point on the element for objective lenses of different focal lengths but with apertures of the same size;

FIGURE 2 is a schematic representation of a photoelectric element in front of the plane of the film and with the same ray paths as shown in FIGURE 1;

FIGURE 3 is a schematic representation of a photoelectric element as shown in FIGURE 2, with an optical correcting means in the form of a single lens interposed in the path of the rays;

FIGURE 3a is a partial side view of FIGURE 3 in which the single lens is substituted by a lens grating plate;

FIGURE 4 is a schematic representation of a photoelectric element in front of the film and with the same ray paths as shown in FIGURE 2; the photoelectric element having correcting means positioned in front of it in the form of concentric rings;

FIGURE 5 shows a schematic view of this invention in which the compensating means are electrical and include a variable resistor;

FIGURE 6 shows a schematic view similar to FIGURE 5, in which the compensating means comprises fixed resistors which are switched into circuit with the corresponding objective lens used;

FIGURE 7 shows a modified side view of one embodiment of this invention in which the compensating means comprise concentric rings imbedded in transparent plastic;

FIGURE 8 is a view of the concentric rings taken along the lines 8—8 of FIGURE 7;

FIGURE 9 is a modification of the concentric ring construction shown in FIGURES 7 and 8;

FIGURE 10 is a another embodiment similar to that shown in FIGURES 7 and 8 in which the concentric rings are positioned in grooves of a transparent plate;

FIGURE 11 shows a general plan view of how rings may be constructed in spiral form;

FIGURE 12 shows diagrammatically how the scale on the exposure meter may be changed in accordance with the particular objective lens being used, and FIGURE 13 shows in cross section another embodiment of the invention consisting of concentric grooves in a transparent plate.

Referring to the drawings more in detail, FIGURE 1 shows the film plane 1 which may be in a still or motion picture camera. Alpha ($\alpha$) is the aperture angle of any of several changeable objective lenses, all of which will be considered as using the same diaphragm opening, because the exposure timing would be uniform only when the diaphragm aperture remains constant. $AP_L$ is the lens aperture of an objective lens having a long focal length and $AP_K$ that of an objective lens having a short focal length. A photoelectric element 2 which may be of the type whose resistance changes with varying light conditions is shown in FIGURE 1 as being positioned in the plane of the film 1. Although this would be the ideal position for it, such a position is not possible because of practical difficulties explained previously. Numeral 3 represents a point on the receiving surface of the photoelectric element 2, near its margin. Rays 4 define a bundle of rays proceeding from the aperture opening $AP_K$ of the short focal length objective lens to point 3 whereas rays 5 define a bundle of rays from the aperture opening $AP_L$ of the long focal length objective lens to the point 3. It can be clearly seen that in both cases the entire bundle of rays always arrives at the point 3.

In FIGURE 2 the photoelectric element 2 is shifted along the optical axis from the plane of the film in the direction of the objective lens to correspond with the actual conditions that would exist in a camera. It will be seen that now although all the light from the bundle of rays bounded by the rays 4 will arrive at the photo-resistor, a portion of the rays from the bundle 5 will by-pass the photo-resistor. Hence when a short focal length objective lens is used, a larger portion of the light will impinge upon the photoelectric element 2 than would when a long focal length objective lens is used.

In FIGURE 2 there is also shown another point 6 lying in the plane of the film 1 which would be outside of the receiving surface of the photoelectric element 2 if the latter were in the plane of the film (as shown in dotted lines). The light which arrives at point 6 would then not fall on the photoelectric element 2.

Two rays 7 form the boundaries of a bundle of rays converging from the lens aperture $AP_K$ upon this point 6, while two rays 8 define a bundle of rays converging from the lens aperture $AP_L$ upon this point. The entire bundle of rays 8 will therefore by-pass the photoelectric element 2, as desired. Of the bundle defined by the rays 7 from the short focal length objective lens, a portion of the rays will fall upon the photoelectric element 2 and thereby cause the exposure meter to respond which should not occur with a correct measurement. In each case the result will be that when the photoelectric element has been shifted in the direction of the objective lens, a larger amount of light will arrive at the element 2 when a short focal length objective lens is used than with an objective lens of long focal length.

FIGURE 3 shows a lens 10 positioned in the path of the rays to serve as an optical correcting means with only the principal plane H H' of the lens being shown for the sake of clarity. This lens causes the rays 4 and 5 and the bundles of rays defined thereby to more strongly converge and to come to a focus, not at point 3 on the surface of the film, but at the point 3' on the photoelectric element 2. All of the light rays from both bundles will then arrive at the element 2. The effect then, of the lens 10 is to shift the plane of the film into the plane of the photo-resistor 2. All rays which originally fell in the plane of the element 2 when positioned in the plane of the film will now also fall upon the latter, while all rays which originally by-passed the element 2 when positioned in the plane of the film will now also by-pass it. The result will be that for both long and short focal length objective lenses the exposure meter will respond in exactly the same manner as if the photo-resistor were in the plane of the film. After the readings are taken the lens 10 and the photoelectric element 2 may be moved out of the path of the image producing light rays by known lever means (not shown) which extend out of the camera housing and are operatively connected to lens 10 and element 2 to move them into or out of the path of image producing light rays as desired. This same technique of moving the various elements into or out of the path of the image producing light rays as desired may be used for other embodiments where applicable as for example in FIGURES 3a and 4.

The relation of the position of the lens 10 and plane of the element 2 is given by the formula:

$$b = \frac{a^2}{f_L + a}$$

Where: $a$ is the distance of the lens 10 from the plane of the film 1,
$f_L$ the focal length of the lens 10,
$b$ the distance of the photoelectric element 2 from the plane of the film 1.

The size of the photoelectric element is then given by the formula:

$$y' = \left(\frac{f_L}{f_L + a}\right) y$$

$y'$ is the radius of the photoelectric element 2 at a distance $b$ from the surface of film 1.
$y$ is the radius of a corresponding photoelectric element if it were positioned in the plane of the film.

Both of these formulas are true for thin intermediate lenses 10 and neither of them is dependent on any parameters of the photo objective lenses.

If with objective lenses of very short focal length the required lens 10 would have to be of such diameter and thickness that its inclusion in a camera would be difficult on account of spatial restrictions, then it could be substituted by a lens grating 11 shown in FIGURE 3a. In such a construction the individual lenses 12 have collectively the same effect as the lens 10, so that such a lens grating would also produce the same effect as if photoelectric element 2 were positioned in the plane of the film. Each grating lens 12 would then require a diaphragm 12a to restrict its field of vision. Such a device will save space in the camera. The lens grating means and the photoelectric element 2 may then be conveniently moved out of the path of the image producing light rays by known means when the film is to be exposed.

In FIGURE 4 the same optical conditions are represented as shown in FIGURE 2. In the plane of the film 1 points 3 and 6 are indicated and the bundles of rays which fall upon these points are bounded by rays (4 and 5) and (7 and 8) respectively. In this embodiment of the compensating means, there are two concentric ring-shaped visors 15 and 16 which are positioned in front of the photoelectric element 2. These rings are concentric with each other and are also axially aligned with the optical axis of the image producing light rays.

Both of these visors function as diaphragms for the more steeply converging rays of the short focal length objective lens by excluding the peripheral rays of the bundles defined by rays 4 and by rays 7 respectively. The photoelectric element 2 will therefore receive the same amount of light from the long focal length objective lens as from the short focal length objective lens. None of the rays normally falling on point 6 will reach the element 2, while of the rays which normally arrive at point 3, about the same fraction will be received from lens apertures $AP_L$ and $AP_K$. Although it is not possible to achieve complete correction of the errors of measurement by this construction it is possible to greatly improve the accuracy of measurement. Experiments have shown that in a camera which has an error of one light-intensity value between the long focal lenses and short focal length focus objectives, a 40% reduction of this error can be achieved by this construction.

The number of these ring-shaped visors and their dimensions such as their diameters, heights and thicknesses must naturally depend on the dimensions of the camera and of the objectives to be used with it.

FIGURE 5 shows an embodiment in which the compensating means is electrical. The exposure meter circuit may include the photoelectric element 2 whose resistance changes with varying light conditions. A variable resistor 16 may be incorporated in series with the element 2 and meter 18. A suitable battery 20 is provided as shown.

The objective lenses $AP_L$ and $AP_K$ having long and short focal lengths respectively are schematically shown mounted on a turret 22. There are suitable means 24 such as known cam and link means which are operatively connected to the movable arm 26 of the variable resistor to vary the resistance in the circuit according to the particular objective lens used as previously explained.

FIGURE 6 is an arrangement similar to that shown in FIGURE 5 except several fixed resistors are used instead of a variable resistor. In FIGURE 6 the turret means 22 on which the objective lenses $AP_L$ and $AP_K$ are mounted is operatively connected to a movable switch arm 28 which connects fixed resistors 30 or 32 in series with the element 2. In the position shown, arm 28 directly connects the photoelectric element 2 with meter 18 from which the corrected readings are obtained.

FIGURES 7 and 8 show an embodiment of the economical compensating means previously mentioned and includes concentric rings 34 and 36 which are embedded in a transparent support member 38. The element 2 may be positioned in the path of the image producing light rays and removed therefrom by known means such as cams and levers which are schematically shown as 42. The rings function as an aperture as previously explained. The means 42 may include a lever accessible from the outside of the camera and connected to the member 38 and element 2 to pivot them into and out of the path of the image producing rays as desired.

FIGURE 9 shows a modification in which the concentric rings positioned in front of the element 2 may be made from ribbon material which are formed into rings 44 and 46 which have overlapping ends 48 as shown and which may be embedded in the transparent support member 38.

FIGURE 10 shows another modification of the compensating means which comprises concentric rings; however, in this modification the rings 34 and 36 are secured in a transparent member 50 having concentric grooves 52 and 54 on one side thereof in which the rings 34 and 36 are respectively positioned.

FIGURE 11 shows a perspective view of a ring 56 which is formed of ribbon material which is spirally wound into a ring.

FIGURE 12 shows an embodiment of this invention which utilizes mechanical compensating means and which may take the form of a rotatable scale generally designated 57 which is incorporated in the exposure meter with the indicator needle 58 being shown.

The objective lenses $AP_L$, $AP_I$, and $AP_K$ having long, intermediate and short focal lengths, respectively are shown positioned on a turret 60 of the camera. The rotatable scale 57 may be rotated on a shaft 62 which is operatively connected by known lever means shown schematically as 64 to shaft 66 on the turret 60. As the turret 60 is turned to position the particular objective lens desired, the associated scales 68, 70 and 72 will be automatically rotated into position on the meter to enable the needle indicator 58 to provide the corrected reading by the principles previously mentioned.

FIGURE 13 shows another embodiment of the invention which includes a transparent member 74 which is positioned in front of the photoelectric element 2. The member 74 has concentric grooves 76 and 78 formed on the surface thereof on the side away from the element 2. The grooves 76 and 78 perform the same function of the concentric rings of the previous embodiments.

It will be understood that this invention is susceptible to modification in order to adapt it to different usages and conditions; and accordingly, it is desired to comprehend such modifications within this invention as may fall within the scope of the appended claims.

What is claimed is:

1. In combination; a photographic camera having a plurality of interchangeable objective lenses, each of said lenses having a different focal length for directing image producing light rays on a film plane in the camera and photoelectric exposure metering means having a light sensitive member with means for positioning it in the path of said light rays between said lenses and said film plane, said light sensitive member including means for compensating for the different amounts of light falling on said light sensitive member due to the different focal lengths of said lenses, said means for compensating including a ring-shaped visor in front of the light sensitive member to prevent the marginal rays of the image-side cone of rays from a lens having shorter focal length from reaching said light sensitive member.

2. The combination as claimed in claim 1 in which said means for compensating are optical and include a lens in the path of said light rays between said objective lenses and said light sensitive member to change the focal point of said objective lenses from said plane of the film to said light sensitive member.

3. The combination as claimed in claim 2 in which said means for compensating comprises a plurality of lenses and a grating plate between said plurality of lenses and said light sensitive member.

4. The combination as claimed in claim 1 in which said means for compensating includes a ring-shaped visor positioned on said light sensitive member with the axis of said visor coaxially aligned with the axis of said image producing light rays, said visor preventing a portion of said image producing light rays from reaching said light sensitive member, said portion of said light rays being those which are steeply inclined to said axis when an objective lens of short focal length is used.

5. In combination as claimed in claim 1 in which said means for compensating includes two ring-shaped visors having different diameters concentrically positioned in front of said light sensitive member with said visors being coaxially aligned with the axis of said image producing light rays, said visors preventing a portion of said image producing light rays from reaching said light sensitive member, said portion of said light rays being those which are steeply inclined to said axis when an objective lens of short focal length is used.

6. The combination as claimed in claim 5 in which said visors are formed of spirally wound material.

7. The combination as claimed in claim 5 in which the means for compensating includes a transparent mounting plate positioned in front of said light sensitive member in the path of said image producing light rays, said mounting plate having said visors embedded therein.

8. The combination as claimed in claim 5 further comprising a transparent mounting plate adapted to be positioned in front of said light sensitive member in the path of said image producing light rays, said mounting plate having spaced concentric grooves in one face thereof, said visors being positioned in said grooves.

9. The combination as claimed in claim 1 in which said means for compensating includes a variable resistance connected in the circuit of said exposure meter and adapted to be changed in accordance with the particular objective lens, said variable resistance being lower in resistance when objective lenses of long focal length are used to correct for measurement errors due to a greater excitation of said light sensitive member when lenses having short focal lengths are used.

10. The combination as claimed in claim 9 further comprising means for automatically changing said variable resistance in conformity with the particular objective lens being used.

11. The combination as claimed in claim 9 in which said variable resistance comprises a plurality of fixed resistors and switching means operatively connected with objective lenses for switching in circuit the particular fixed resistor for the particular objective lens being used.

12. The combination as claimed in claim 1 in which said means for compensating comprises mechanical means connected to said exposure meter adapted to provide a corrected reading in accordance with the particular objective lens being used.

13. The combination as claimed in claim 12 in which said mechanical means includes a changeable scale adapted to be rotated with a reading position on said meter in conformity with the particular objective lens being used.

14. The combination as claimed in claim 13 further comprising means for automatically rotating said changeable scale with said reading position.

15. In combination; a photographic camera having changeable objective lenses with different focal lengths for directing the image producing light rays on the plane of the film in the camera and photoelectric exposure metering means having the light sensitive member thereof adapted to be positioned in the path of said light rays between said lenses and said plane of the film, means for compensating for the different amounts of light falling on said cell due to the different focal lengths of said lenses, and means for positioning both said sensitive member and said means for compensating in and out of the path of said image producing light rays as desired.

16. In combination; a photographic camera having changeable objective lenses with different focal lengths for directing the image producing light rays on the plane of the film in the camera and a photoelectric exposure meter having a light sensitive member adapted to be positioned in the path of said light rays between said lenses and said plane of the film, and means for compensating for the different amounts of light falling on said light sensitive member due to the different focal lengths of said lenses, said means for compensating comprising; a transparent member with means for positioning it in the path of said light rays and having concentric grooves formed in one surface thereof for preventing a portion of said image producing light rays from reaching said light sensitive member.

17. In combination; a photographic camera having changeable objective lenses with different focal lengths for directing image producing light rays on the plane of a film in a camera and photoelectric exposure metering means having a light sensitive member adapted to be positioned in the path of said light rays between said lenses and said plane of the film, means for positioning said sensitive member in and out of the path of said image producing light rays as desired, and means for compensating for the different amounts of light falling on said light sensitive member when objective lenses of different focal lengths are used as a result of the position of said light sensitive member outside of said film plane, said means for compensating including a visor in front of the light sensitive member to prevent the marginal rays of the image-side cone of rays from a lens having shorter focal length from reaching said light sensitive member.

References Cited

UNITED STATES PATENTS

| | | | |
|---|---|---|---|
| 2,879,691 | 3/1959 | Faulhaber | 88—23 |
| 2,937,582 | 5/1960 | Goshima | 95—10 |
| 2,976,789 | 3/1961 | Zimmer | 95—10 |
| 2,994,256 | 8/1961 | La Rue et al. | 88—23 XR |
| 2,995,070 | 8/1961 | Von Hortenau | 88—23 XR |
| 3,094,053 | 6/1963 | Lieser | 95—10 |
| 3,205,796 | 9/1965 | Lieser | 95—10 |
| 3,262,380 | 7/1966 | Winkler | 95—10 |

OTHER REFERENCES

Graul et al., German printed application 1,096,742, printed Jan. 5, 1961.

NORTON ANSHER, *Primary Examiner.*

J. F. PETERS, JR., *Assistant Examiner.*

U.S. Cl. X.R.

88—23; 95—42; 250—237